Sept. 11, 1962 E. M. FOX 3,053,282
WELDED PIPELINE REPAIR CLAMP
Filed Feb. 3, 1959 2 Sheets-Sheet 1
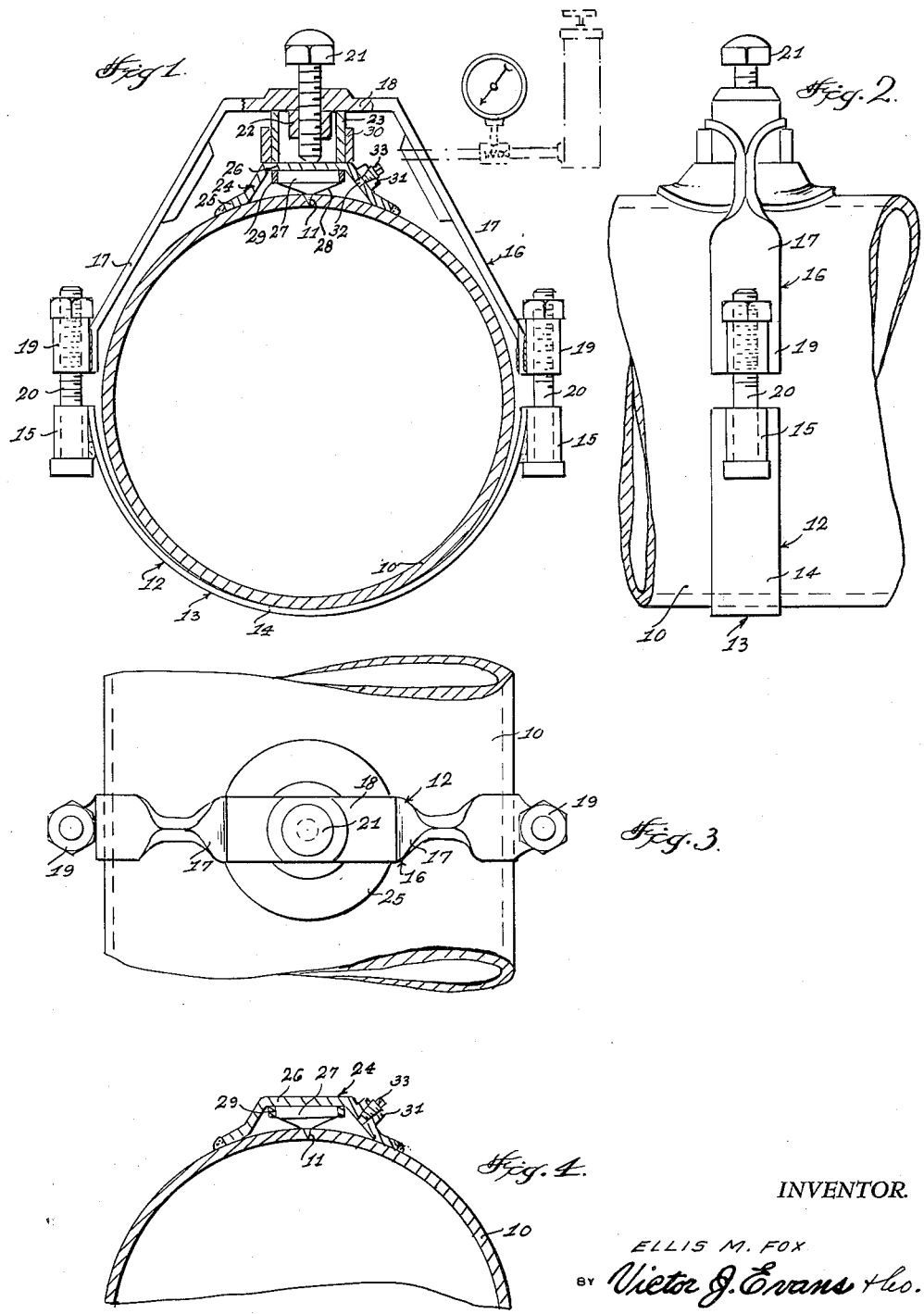
INVENTOR.
ELLIS M. FOX
BY Victor J. Evans & Co.
ATTORNEYS

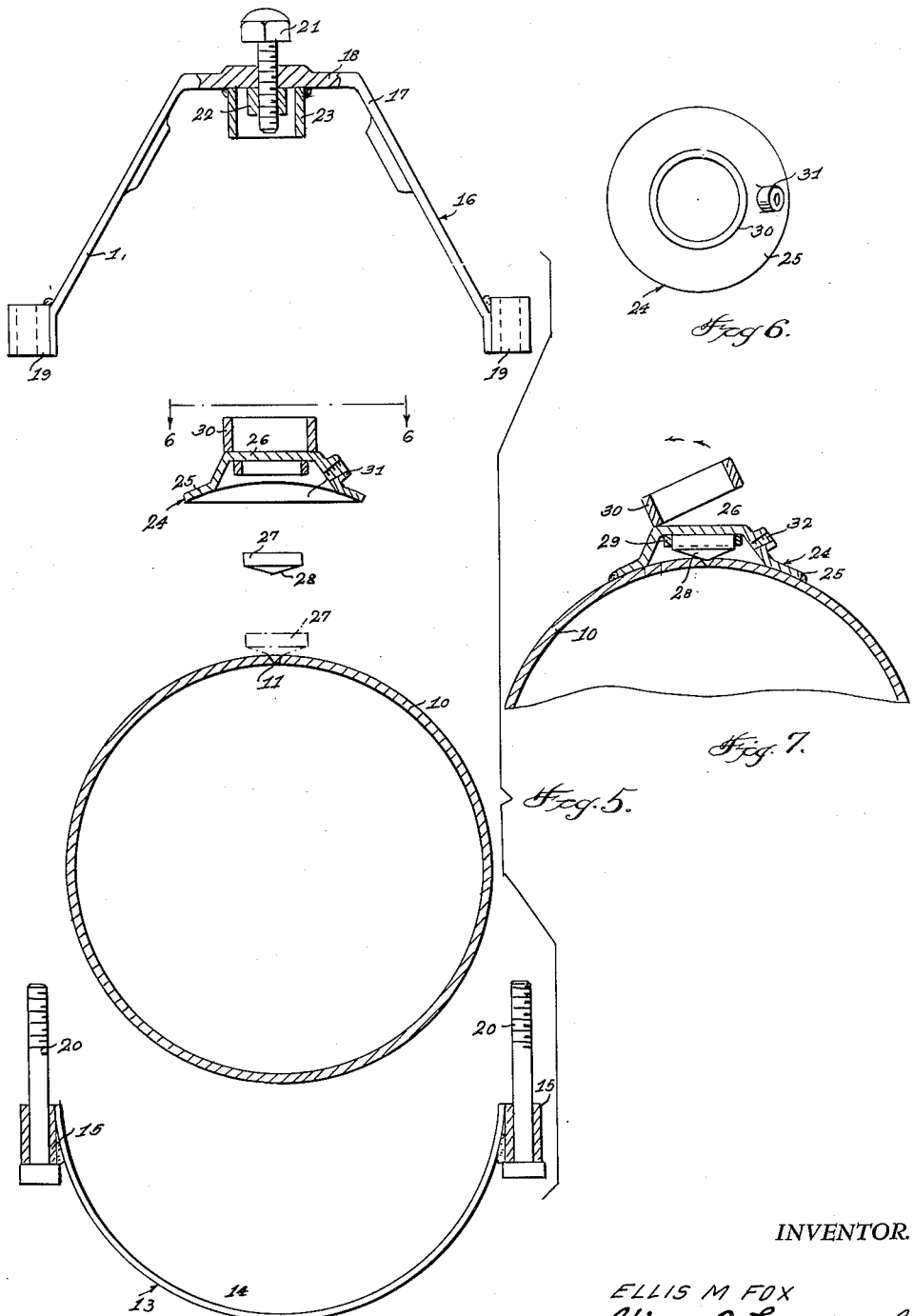

United States Patent Office 3,053,282
Patented Sept. 11, 1962

3,053,282
WELDED PIPELINE REPAIR CLAMP
Ellis M. Fox, 613 Rhode Island Ave., Rock Springs, Wyo.
Filed Feb. 3, 1959, Ser. No. 790,910
3 Claims. (Cl. 138—99)

This invention relates to a method of and means for repairing leaks in pipelines.

The object of the invention is to provide a means for repairing leaks in pipelines, conduits or the like, as for example when the pipelines are used for transmitting volatile or combustible materials such as gasoline, crude oil, natural gas or the like.

Another object of the invention is to provide a means for repairing leaks in pipes, conduits or the like, wherein initially the leak is stopped or closed off by means of a rubber or resilient seal, and then a patch is welded in place over the leak, and wherein there is also provided a means for testing the patch to make sure that the leak has been properly sealed off or repaired.

A further object of the invention is to provide a pipeline repair assembly which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a sectional view taken through a pipe line, showing the assembly of the present invention being used;

FIGURE 2 is an elevational view taken at right angles to the view shown in FIGURE 1;

FIGURE 3 is a plan view looking at the assembly of FIGURES 1 and 2;

FIGURE 4 is a fragmentary sectional view showing the completed patch assembly after the leak has been repaired;

FIGURE 5 is a fragmentary sectional view showing the parts disassembled or exploded;

FIGURE 6 is a sectional view taken on the line 6—6 of FIGURE 5, and

FIGURE 7 is a fragmentary sectional view showing one of the steps in completing the job.

Referring in detail to the drawings, the numeral 10 indicates a pipeline or conduit which is provided with a leak or opening 11 that is to be repaired, and according to the present invention there is provided a clamp which is indicated generally by the numeral 12. The clamp 12 includes a first body member 13 which embodies a main portion 14 of arcuate formation which surrounds a portion of the pipeline 10. Arranged on the ends of the body member 13 are spaced apart apertured bushings 15, FIGURE 1. The clamp 12 further includes a second body member 16 which includes angularly arranged portions 17 or arms 17 and a connecting web portion 18, and apertured bushings 19 on the ends of the body member 16 are arranged in alinement with the bushings 15 when the parts are assembled as for example as shown in FIGURES 1, 2 and 3. The numeral 20 indicates securing elements such as bolt and nut assemblies which are used for connecting the bushings 15 and 19 together.

A screw member or bolt 21 extends through the web portion 18 and engages a lock nut 22, and the numeral 23 indicates a circular collar which projects inwardly from the web portion 18 and which is secured thereto or formed integral therewith. The numeral 24 indicates a patch which includes an outer circular section 25 as well as a central offset cup-shaped portion 26. A resilient seal 27 is arranged contiguous to the inner surface of the portion 26, and the seal 27 is provided with a pointed end 28 for engaging the leak 11 to be repaired. The numeral 29 indicates a retainer ring which surrounds the seal 27. As shown in the drawings, a guide ring 30 is adapted to be arranged contiguous to the outer portion of the patch 24, and the collar 23 is adapted to project into the guide ring 30 as shown in FIGURE 1, when the parts are in their assembled positions.

The patch 24 is further provided with a fitting 31 which is internally threaded as at 32 so that a plug 33 can be selectively arranged in engagement with the opening 32 in the fitting 31. A test meter or force of air under pressure may be connected to the fitting 31 in order to test the welded patch after the same has been secured in place on the pipeline, and after the patch has been tested, the test equipment can be removed and then the plug 33 can be inserted in the opening 32 so as to close off the patch.

From the foregoing, it is apparent that there has been provided a method of and means for repairing a leak such as a leak 11 in a pipeline 10. According to the present invention the parts are adapted to be arranged as shown in FIGURES 1, 2 and 3 for example so that the clamp 12 surrounds and engages the outer surface of the pipeline 10 in the vicinity of the leak or opening 11 which is to be repaired. First the pointed end 28 of the rubber seal 27 is arranged in engagement with the leak 11 and the ring 29 and patch 24 help hold the seal 27 in its proper position. The members 13 and 16 of the clamp 12 are held in their proper position on the pipeline 10 by means of the bolt and nut assemblies 20 and the screw member 21 is tightened so that the inner end of the screw member 21 bears against the patch 24 in order to maintain the pointed end 28 of the seal 27 in engagement with the leak or opening 11. With the seal 27 held in this position, no more material can flow out or pass out through the opening 11, as for example when gasoline, natural gas, oil or the like is passing through the pipeline 10. After the leak 11 is temporarily stopped by the seal 27, the outer portion 25 of the patch 24 is secured in place to the pipeline 10 as by welding. Next, a suitable conduit can be connected to the fitting 31 so that air under pressure is conveyed to the interior of the patch 24 and the pressure of this air may be measured by a suitable meter. After the meter or a suitable gauge has been used for testing the effectiveness of the welded patch 24, the gauge or meter can be disconnected from the fitting 31 and a plug such as the plug 33 can be arranged in engagement with the fitting 31 so as to effectively close off the patch. Then, the bolt and nut assemblies 20 are loosened and the members 16 and 13 are removed so as to leave only the completed patch 24 and its associated parts in the position of FIGURE 4 so that the pipeline can be used in the normal or regular manner. The ring 30 may be removed from the patch 24 after the repair job has been completed.

The parts can be made of any suitable material and in different shapes or sizes.

Thus, it will be seen that the assembly of the present invention can be used over and over again since the clamp is removed from the pipeline after the leak has been repaired.

A suitable tool such as a chisel can be used for removing the guide ring 30 after the repair job is finished. The patch 24 is secured in place on the pipeline 10 by welding the same thereon. Hydrostatic test equipment can be used in conjunction with the device. The present invention can be used for repairing leaks as for example when leaks occur in badly corroded pipes. The weld patch of the present invention is adapted to be used for making permanent repairs to a pipeline leak while the pipeline is under working pressure. For example, the device can be used on a natural gas pipeline under pressure and there will be no interruption to normal use of the pipeline.

The present invention makes it possible to weld over a leak while the line is under pressure and the patch 24 includes the offset central portion 26 which houses the rubber plug 27. This plug or seal 27 is of the proper diameter and thickness to seal the leak when clamped down to the pipe surface and welding of the patch 24 is then possible. The vent or fitting 31 is used to add pressure under the patch after welding has been completed in order to test the porosity or effectiveness of the weld. Furthermore, the fitting 31 can function as a bleed-off and test hole and it can be plugged with the member 27 for the final seal. The guide ring 30 helps guide the collar 23 and the ring 30 is adapted to be removed after the final weld. The seal 27 can be made of a suitable material such as rubber and the seal is maintained in place by means of the guide ring 29.

Minor changes in shape, size and rearrangement of details coming within the field of invention claimed may be resorted to in actual practice, if desired.

I claim:

1. In a pipeline repair device, a clamp including a first body member having a main portion of arcuate formation, apertured bushings on the ends of said first body member; a second body member having apertured bushings on its ends arranged in alinement with the bushings on the first body member, securing elements extending through said bushings; said second body member including angularly arranged arms connected by a web portion; a screw member extending through said web portion, a collar extending inwardly from the inner surface of said web portion; a patch including a central cup-shaped portion, a resilient seal engaging the inner surface of said cup-shaped portion, and a guide ring secured to the outer surface of said patch for receiving said collar.

2. The structure as defined in claim 1, and further including a retainer ring surrounding said seal.

3. In a pipeline repair device, a clamp including a first body member having a main portion of arcuate formation, apertured bushings on the ends of said first body member; said clamp further including a second body member having apertured bushings on its ends arranged in alinement with the bushings on the first body member, securing elements extending through said bushings; said second body member including angularly arranged arms connected by a web portion; a screw member extending through said web portion, a collar extending inwardly from the inner surface of said web portion; a patch including a central cup-shaped portion, a resilient seal engaging the inner surface of said cup shaped portion, a guide ring secured to the outer surface of said patch for receiving said collar, said seal having a pointed end, a retainer ring surrounding said seal, said patch including a fitting that is provided with an internally threaded opening, and a plug adapted to engage the threaded opening in said fitting.

References Cited in the file of this patent

UNITED STATES PATENTS

| | | |
|---|---|---|
| 2,077,050 | Merrill | Apr. 13, 1937 |
| 2,199,552 | Watson | May 7, 1940 |
| 2,236,913 | Merrill | Apr. 1, 1941 |
| 2,581,015 | Graham | Jan. 1, 1952 |
| 2,655,946 | Morris | Oct. 20, 1953 |